United States Patent
Qian et al.

(10) Patent No.: US 11,175,823 B2
(45) Date of Patent: Nov. 16, 2021

(54) METHOD AND APPARATUS FOR CONTROLLING TERMINAL DEVICE USING GESTURE CONTROL FUNCTION, AND NON-TRANSITORY COMPUTER-READABLE STORAGE MEDIUM

(71) Applicant: BAIDU ONLINE NETWORK TECHNOLOGY (BEIJING) CO., LTD., Beijing (CN)

(72) Inventors: Lu Qian, Beijing (CN); Wenbo Li, Beijing (CN); Mingwei Li, Beijing (CN); Yawen Diao, Beijing (CN)

(73) Assignees: Baidu Online Network Technology (Beijing) Co., Ltd., Beijing (CN); Shanghai Xiaodu Technology Co. Ltd., Shanghai (CN)

( * ) Notice: Subject to any disclaimer, the term of this patent is extended or adjusted under 35 U.S.C. 154(b) by 0 days.

(21) Appl. No.: 16/880,534

(22) Filed: May 21, 2020

(65) Prior Publication Data

US 2021/0149558 A1  May 20, 2021

(30) Foreign Application Priority Data

Nov. 20, 2019  (CN) .......................... 201911152245.5

(51) Int. Cl.
  *G06F 3/0488* (2013.01)
  *G06K 9/20* (2006.01)
  (Continued)

(52) U.S. Cl.
  CPC ...... *G06F 3/04883* (2013.01); *G06F 3/04845* (2013.01); *G06K 9/00335* (2013.01); *G06K 9/20* (2013.01)

(58) Field of Classification Search
  CPC .. G06F 3/04883; G06F 3/04845; G06F 3/005; G06F 3/017; G06K 9/00335; G06K 9/20; H04N 5/23216
  See application file for complete search history.

(56) References Cited

U.S. PATENT DOCUMENTS

| | | | |
|---|---|---|---|
| 2008/0170078 A1* | 7/2008 | Sullivan | G06K 9/00315 345/473 |
| 2014/0211047 A1* | 7/2014 | Lee | H04N 5/23216 348/240.99 |

(Continued)

FOREIGN PATENT DOCUMENTS

WO   WO2014/147686   *  9/2014   ........... G06F 3/01

*Primary Examiner* — Eric J Yoon
(74) *Attorney, Agent, or Firm* — Fay Sharpe LLP

(57) ABSTRACT

The present disclosure provides a method and apparatus for controlling a terminal device, and a storage medium. The method includes: when a gesture control function is activated on a current interface of the terminal device, obtaining an interface identifier of the current interface and a preset motion corresponding to the interface identifier; turning on a camera and displaying an image taken by the camera in a preset display area of the current interface; determining whether the image contains a motion image matching with the preset motion; and if the image contains the motion image matching with the preset motion, obtaining an operation instruction corresponding to the motion image, and controlling the current interface according to the operation instruction.

11 Claims, 4 Drawing Sheets

(51) Int. Cl.
*G06K 9/00* (2006.01)
*G06F 3/0484* (2013.01)

(56) References Cited

U.S. PATENT DOCUMENTS

| | | | |
|---|---|---|---|
| 2014/0219515 A1* | 8/2014 | Karakotsios | G06K 9/00167 |
| | | | 382/115 |
| 2016/0104037 A1* | 4/2016 | Li | H04N 7/18 |
| | | | 348/77 |
| 2017/0026574 A1* | 1/2017 | Kwon | H04N 5/232935 |
| 2017/0026831 A1* | 1/2017 | Jung | G06F 21/84 |
| 2017/0131395 A1* | 5/2017 | Reynolds | G01S 13/003 |
| 2018/0278835 A1* | 9/2018 | Meganathan | H04N 5/23219 |
| 2020/0301512 A1* | 9/2020 | Davies | G06F 3/017 |

\* cited by examiner

METHOD AND APPARATUS FOR CONTROLLING TERMINAL DEVICE USING GESTURE CONTROL FUNCTION, AND NON-TRANSITORY COMPUTER-READABLE STORAGE MEDIUM

CROSS-REFERENCE TO RELATED APPLICATION

The present application is based upon and claims priority to Chinese Patent Application No. 201911152245.5, filed on Nov. 20, 2019, the entirety contents of which are incorporated herein by reference.

TECHNICAL FIELD

The present disclosure mainly relates to a field of computer vision technologies in computer technologies, and more particularly, to a method and apparatus for controlling a terminal device, and a non-transitory computer-readable storage medium.

BACKGROUND

With the development of computer technologies, terminal device products depending on computer technologies are diversified, for example, smart speakers that satisfy users' speaker play service, and video playback devices that satisfy users' video viewing service.

In the related art, the operation mode of the terminal device is touch operation or voice operation, and the flexibility of the operation mode is limited.

SUMMARY

Embodiments of the present disclosure provide a method for controlling a terminal device. The method includes: when a gesture control function is activated on a current interface of the terminal device, obtaining an interface identifier of the current interface and a preset motion corresponding to the interface identifier; turning on a camera and displaying an image taken by the camera in a preset display area of the current interface; determining whether the image contains a motion image matching with the preset motion; and if the image contains the motion image matching with the preset motion, obtaining an operation instruction corresponding to the motion image, and controlling the current interface according to the operation instruction.

Embodiments of the present disclosure provide an apparatus for controlling a terminal device. The apparatus includes: one or more processors; a memory storing instructions executable by the one or more processors; in which the one or more processors are configured to: when a gesture control function is activated on a current interface of the terminal device, obtain an interface identifier of the current interface and a preset motion corresponding to the interface identifier; turn on a camera and displaying an image taken by the camera in a preset display area of the current interface; determine whether the image contains a motion image matching with a preset motion; and if the image contains the motion image matching with the preset motion, obtain an operation instruction corresponding to the motion image, and control the current interface according to the operation instruction.

Embodiments of the present disclosure provide a non-transitory computer-readable storage medium storing computer instructions, when the computer instructions are executed, the computer is caused to implement the method for controlling a terminal device according to embodiments of the present disclosure, and the method includes: when a gesture control function is activated on a current interface of the terminal device, obtaining an interface identifier of the current interface and a preset motion corresponding to the interface identifier; turning on a camera and displaying an image taken by the camera in a preset display area of the current interface; determining whether the image contains a motion image matching with the preset motion; and if the image contains the motion image matching with the preset motion, obtaining an operation instruction corresponding to the motion image, and controlling the current interface according to the operation instruction.

Additional effects of the foregoing optional manners will be described below in combination with specific embodiments.

BRIEF DESCRIPTION OF THE DRAWINGS

The accompanying drawings are used to better understand the solution, and do not constitute a limitation on the present disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description. The method and apparatus for controlling a terminal device according to embodiments of the present disclosure will be described below with reference to the drawings.

In view of the current terminal device control method mentioned in the background art, which relies on touch operation or voice operation, the user needs to focus on the operation of the terminal device, thereby resulting in a technical problem that the interactive experience is unsatisfied, the present disclosure provides a way in which the terminal device can be operated based on motions, thereby improving the user's sense of interaction.

The terminal device in the embodiment of the present disclosure may include hardware devices with screens and cameras, such as a speaker, a mobile phone, and a notebook computer.

The solution of the present disclosure provides following advantages or beneficial effects.

When a gesture control function is activated on a current interface of the terminal device, an interface identifier of the current interface and a preset motion corresponding to the interface identifier are obtained. A camera is turned on and an image taken by the camera is displayed in a preset display area of the current interface. It is determined whether the image contains a motion image matching with the preset motion, and if the image contains the motion image matching with the preset motion, an operation instruction corresponding to the motion image is obtained, and the current interface is controlled according to the operation instruction. Therefore, the current interface is controlled in a visual motion operation mode, which improves operation intellectuality and interactivity.

Figure 1:
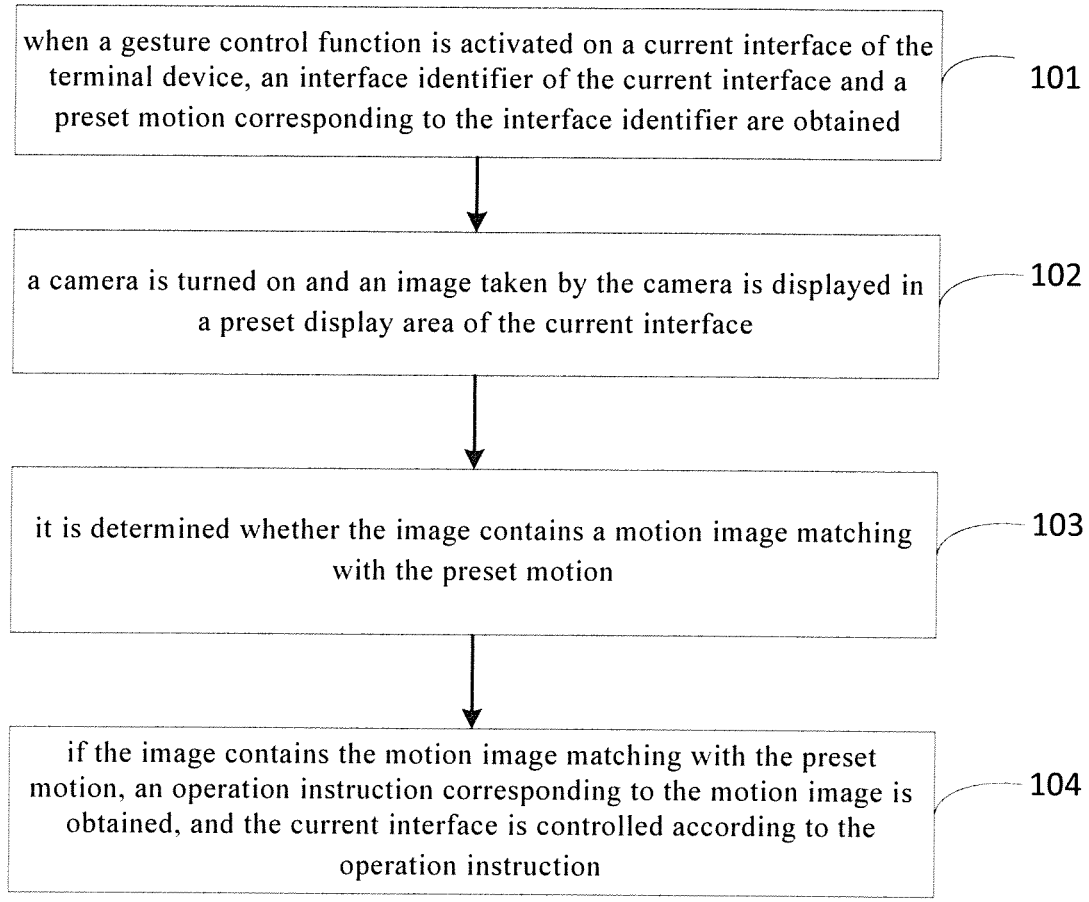
FIG. 1 is a flowchart of a method for controlling a terminal device according to a first embodiment of the present disclosure.

In detail, FIG. 1 is a flowchart of a method for controlling a terminal device according to a first embodiment of the present disclosure. As illustrated in FIG. 1, the method includes the following steps.

At step 101, when a gesture control function is activated on a current interface of the terminal device, an interface identifier of the current interface and a preset motion corresponding to the interface identifier are obtained.

The above-mentioned preset motion may be any one or a combination of a gesture motion and a facial expression motion.

It is noted that in different application scenarios, the manners of enabling the gesture control function are different. As a possible implementation, the gesture control function is turned on by voice. As another possible implementation, an entrance for enabling the gesture control function is set on the current interface, and an enabling interface is displayed to the user by a trigger operation for the entrance. The user can click the enter control on the enabling interface to enable the gesture control function for the current interface. The entrance can be displayed over the current interface in the form of a floating window.

Figure 2:
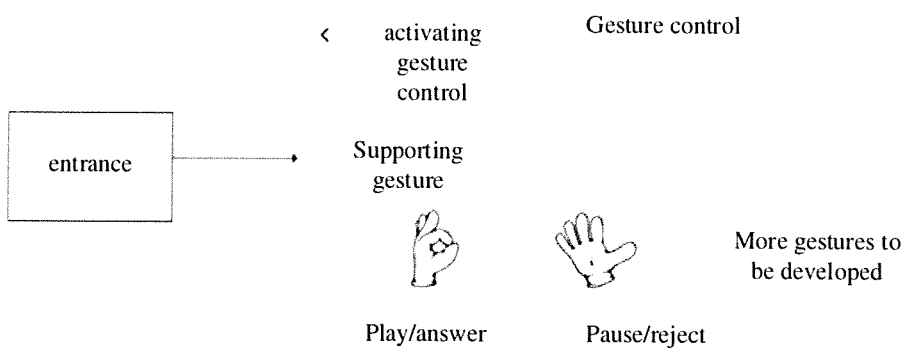
FIG. 2 is a schematic diagram of an application scenario of a method for controlling a terminal device according to a second embodiment of the present disclosure.

It is understood that in the embodiment, different preset motions are set for different interfaces, so as to meet personalized requirements of the user. In the specific setting process, when the preset motion is a gesture motion, as illustrated in FIG. 2, preset gesture motions supported can be set in the above startup interface, and when the current interface of the terminal device enables the gesture control function, the interface identifier of the current interface and the preset motion corresponding to the interface identifier are obtained, the interface identifier may be an application identifier to which it belongs, or a function type identifier of the current interface.

In the embodiments of the present disclosure, in order to make full use of resources, usage rate of each function in the current interface may be counted, and when the usage rate is greater than a certain value, a preset motion is set for the function.

Figure 3:
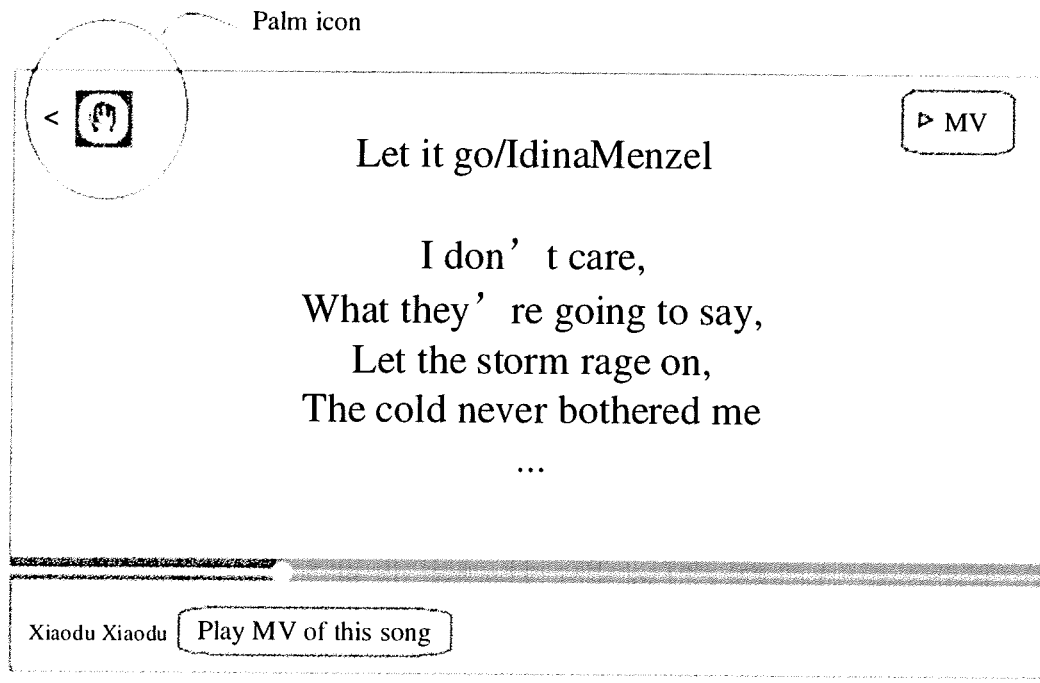
FIG. 3 is a schematic diagram of an application scenario of a method for controlling a terminal device according to a third embodiment of the present disclosure.

In the embodiment, in order to facilitate the user to control the current interface based on the motion, an idle position of the current interface may be determined, for example, a position corresponding to a display area where the display content is less relevant to the theme of the content of the current interface, a motion control icon is displayed in an idle position, which is a default icon or customized according to the user's personal preferences. For example, as illustrated in FIG. 3, a "palm icon" is displayed on the current interface to indicate that the current gesture control function is turned on.

A step 102, a camera is turned on and an image taken by the camera is displayed in a preset display area of the current interface.

The preset display area may be set in advance for the display condition of the current interface, or may be a display area corresponding to a default fixed position.

Figure 4:
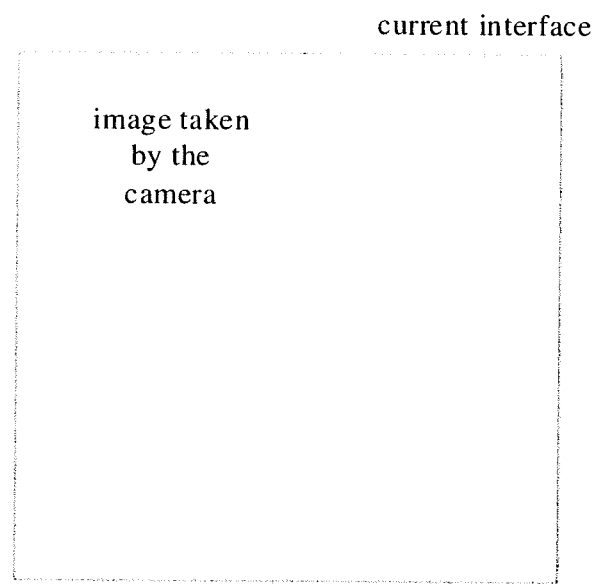
FIG. 4 is a schematic diagram of an application scenario of a method for controlling a terminal device according to a fourth embodiment of the present disclosure.

In detail, the camera is turned on and an image taken by the camera is displayed in a preset display area of the current interface, so that the user can intuitively check input condition of the current motion, thereby improving the efficiency of motion collection. As illustrated in FIG. 4, the user checks collection condition of his motion images in the display area of the current interface.

In the embodiment, the user can adjust the size of the screen according to his visual experience or operation condition on the current interface, and receive a zoom instruction on the preset display area, which may be a touch operation or a voice operation, the size of the preset display area is adjusted according to the zoom instruction on the preset display area to meet the user's requirements.

A step 103, it is determined whether the image contains a motion image matching with the preset motion.

In detail, it is determined whether the motion image corresponding to the preset motion is included in the screen, so as to determine the operation instruction by the user.

The preset motion may be a dynamic action composed of a series of actions (such as extending a hand forward), or a single static action (such as an OK gesture). Therefore, the methods of determining whether the image contains a motion image matching with the preset motion is different. As a possible implementation, continuous multi-frame images are obtained and a plurality of candidate motion images in the continuous multi-frame images are identified. The candidate motion images depend on the preset motion type. If the preset motion is a gesture motion, the candidate motion image is a hand motion image, and a change rule of image features corresponding to the candidate motion images is determined. The change rule includes information reflecting changes in the user's movements, such as the proportion of the hand image becomes larger or smaller, and the trajectory of hand movements, to determine whether the change rule matches the change rule of the image features corresponding to the preset motion. If the change rule matches the change rule of the image features corresponding to the preset motion, then the image contains the image matching with the preset motion.

For example, when the preset motion is a gesture action, the preset motion change rule is that when the hand is doing a push gesture, then the hand motion in the image is recognized, and when the image of the hand becomes larger, it indicates that the user is doing a push gesture using the hand, so that the user motion is consistent with the preset motion.

As another possible implementation, it is determined that the motion image included in the current image, and it is determined whether the motion image feature matches the image feature of the preset motion, and the image feature may be a gesture motion type or the like.

For example, when the gesture motion of the user is recognized as "ok" according to the motion image included in the current image, it indicates that the user's motion matches the preset motion.

At step 104, if the image contains the motion image matching with the preset motion, an operation instruction corresponding to the motion image is obtained, and the current interface is controlled according to the operation instruction.

In detail, if a motion image is included, an operation instruction corresponding to the motion image is obtained, and further, the current interface is controlled according to the operation instruction, that is, the current interface is controlled to respond to operations, and the corresponding current interface is switched. Therefore, the control of the current interface based on the gesture motion is realized. To further improve the sense of interaction, a motion recognition animation corresponding to the interface identifier is determined, for example, the motion recognition animation corresponding to the interface identifier is set in advance, or a motion recognition animation corresponding to the motion image is determined. For example, a template with a similarity exceeding a preset value as the motion recognition animation in advance in a preset motion template for different motion images, and the motion recognition animation is displayed on the current interface to indicate that the current motion is in the recognition process.

It is noted that, in different application scenarios, the ways to obtain the operation instruction corresponding to the motion image are different. Examples are provided as follows.

Example 1

In the embodiment, different operation instructions are set in advance for preset motions corresponding to different interface identifiers, and the aforementioned preset relation is queried based on the currently matched preset motions to obtain the operation instructions.

For example, the current interface is a telephone answering interface, and a matching preset action is "OK", and a corresponding instruction is "answering", so that the obtained operation instruction is a "answering" instruction.

Example 2

In the embodiment, it is considered that some common preset motions are often added to the action control scene, therefore, common operation instructions are set based on the preset motions, and when matching preset motions are obtained, the common operation instructions of the preset motions are used as operation instructions.

For example, for the preset motion, for example, the OK gesture motion, the common operation instruction is "ok, answering, sending". Therefore, the common operation instructions can be used as the corresponding operation instructions.

Certainly, in actual execution process, there may be a plurality of current interfaces that enable the gesture control function, or there may be a plurality of functions that can respond to the same preset motion on the current interface. Therefore, in order to improve the operation experience, priorities are set for different current interfaces, or for different functions of the same current interface, the interface or function of higher priority is preferably responded to.

In conclusion, with the method for controlling a terminal device according to embodiments of the present disclosure, when a gesture control function is activated on a current interface of the terminal device, an interface identifier of the current interface and a preset motion corresponding to the interface identifier are obtained. A camera is turned on and an image taken by the camera is displayed in a preset display area of the current interface. It is determined whether the image contains a motion image matching with the preset motion, and if the image contains the motion image matching with the preset motion, an operation instruction corresponding to the motion image is obtained, and the current interface is controlled according to the operation instruction. Therefore, the current interface is controlled in a visual motion operation mode, which improves operation intellectuality and interactivity.

Figure 5:
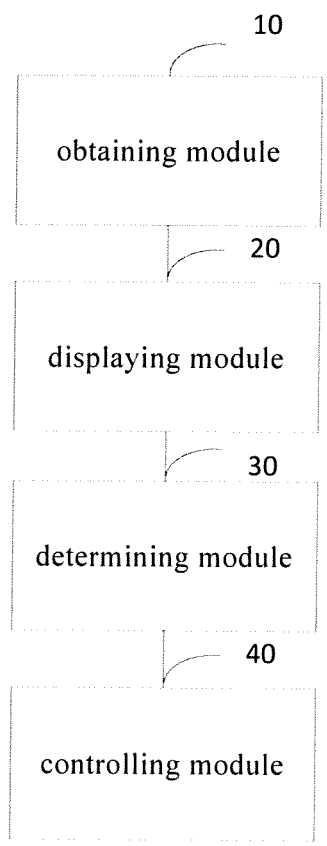
FIG. 5 is a schematic diagram of an apparatus for controlling a terminal device according to a fifth embodiment of the present disclosure.

In order to achieve the above embodiments, the present disclosure further provides an apparatus for controlling a terminal device. FIG. 5 is a schematic diagram of an apparatus for controlling a terminal device according to an embodiment of the present disclosure. As illustrated in FIG. 5, the apparatus for controlling a terminal device includes:

an obtaining module 10, configured to, when a gesture control function is activated on a current interface of the terminal device, obtain an interface identifier of the current interface and a preset motion corresponding to the interface identifier;

a displaying module 20, configured to turn on a camera and displaying an image taken by the camera in a preset display area of the current interface;

a determining module 30, configured to determine whether the image contains a motion image matching with a preset motion; and a controlling module 40, configured to, if the image contains the motion image matching with the preset motion, obtain an operation instruction corresponding to the motion image, and control the current interface according to the operation instruction.

In an embodiment of the present disclosure, the determining module 30 is configured to:

obtain continuous multi-frame image, and identify a plurality of candidate motion images in the continuous multi-frame image;

determine a change rule of a plurality of image features corresponding to the plurality of candidate motion images; and determine whether the change rule matches with a change rule of an image feature corresponding to the preset motion.

In an embodiment of the present disclosure, the determining module 30 is configured to:

determine a motion image contained in the current image; and determine whether an image feature of the motion image matches with an image feature of the preset motion.

Figure 6:
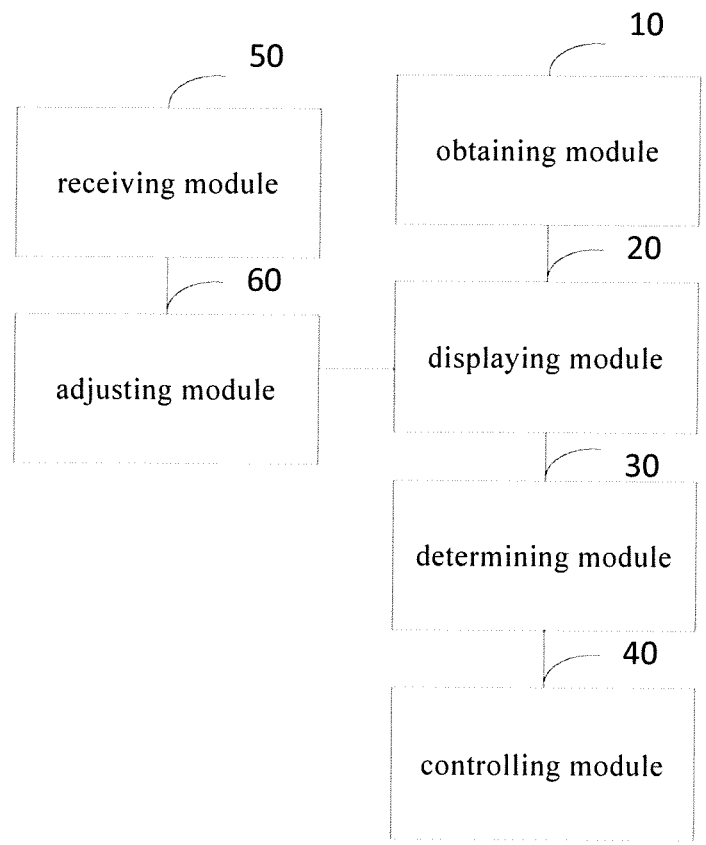
FIG. 6 is a schematic diagram of an apparatus for controlling a terminal device according to a sixth embodiment of the present disclosure.

In an embodiment of the present disclosure, as illustrated in FIG. 6, based on FIG. 5, the apparatus further includes:

a receiving module 50, configured to receive a zoom instruction of the preset display area; and an adjusting module 60, configured to adjust a size of the preset display area according to the zoom instruction of the preset display area.

It is noted that the foregoing explanation of the method for controlling a terminal device is also applicable for the apparatus for controlling a terminal device according to the embodiments of the present disclosure, and its implementation principle is similar, which is not repeated herein.

In conclusion, with the apparatus for controlling a terminal device according to embodiments of the present disclosure, when a gesture control function is activated on a current interface of the terminal device, an interface identifier of the current interface and a preset motion corresponding to the interface identifier are obtained. A camera is turned on and an image taken by the camera is displayed in a preset display area of the current interface. It is determined whether the image contains a motion image matching with the preset motion, and if the image contains the motion image matching with the preset motion, an operation instruction corresponding to the motion image is obtained, and the current interface is controlled according to the operation instruction. Therefore, the current interface is controlled in a visual motion operation mode, which improves operation intellectuality and interactivity.

According to an embodiment of the present disclosure, the present disclosure also provides an electronic device and a readable storage medium.

Figure 7:
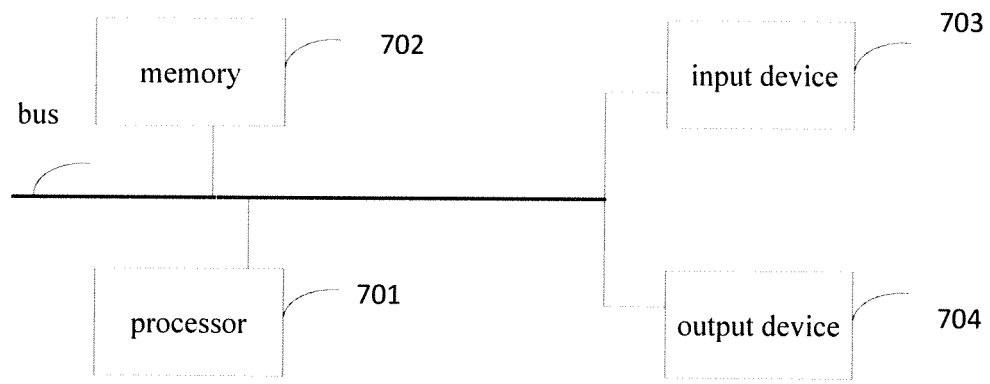
FIG. 7 is a block diagram of an electronic device according to an embodiment of the present disclosure.

FIG. 7 is a block diagram of an electronic device for implementing a method for controlling a terminal device according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 7.

The memory 702 is a non-transitory computer-readable storage medium according to the present disclosure. The memory stores instructions executable by at least one processor, so that the at least one processor executes the voice control method according to the present disclosure. The non-transitory computer-readable storage medium of the present disclosure stores computer instructions, which are used to cause a computer to execute the voice control method according to the present disclosure.

As a non-transitory computer-readable storage medium, the memory 702 is configured to store non-transitory software programs, non-transitory computer executable programs and modules, such as program instructions/modules corresponding to the voice skill creation method in the embodiment of the present disclosure (For example, the obtaining module 10, the displaying module 20, the determining module 30, the controlling module 40 shown in FIG. 5). The processor 701 executes various functional applications and data processing of the server by running non-transitory software programs, instructions, and modules stored in the memory 702, that is, implementing the traffic scheme control method in the foregoing method embodiment.

The memory 702 may include a storage program area and a storage data area, where the storage program area may store an operating system and application programs required for at least one function. The storage data area may store data created according to the use of the electronic device, and the like. In addition, the memory 702 may include a high-speed random access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device through a network. Examples of the above network include, but are not limited to, the Internet, an intranet, a local area network, a mobile communication network, and combinations thereof.

The electronic device for implementing a method for controlling the terminal device may further include an input device 703 and an output device 704. The processor 701, the memory 702, the input device 703, and the output device 704 may be connected through a bus or in other manners. In FIG. 7, the connection through the bus is taken as an example.

The input device 703 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

It should be understood that the various forms of processes shown above can be used to reorder, add, or delete steps. For example, the steps described in this application can be executed in parallel, sequentially, or in different orders, as long as the desired results of the technical solutions disclosed in this application can be achieved, which is no limited herein.

The foregoing specific implementations do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A method for controlling a terminal device, comprising:
    when a gesture control function is activated on a current interface of the terminal device, obtaining interface identifiers of different functions of the current interface and a preset gesture motion corresponding to interface identifiers of a function, wherein the preset gesture motion is a dynamic action composed of a series of actions and reflects a change rule of an image feature, the different functions having different priorities;
    counting a usage rate of each of the different functions;
    assigning the preset gesture motion to a particular function of the different functions based on the usage rate of the particular function being greater than a preset value;
    turning on a camera and displaying an image taken by the camera in a preset display area of the current interface;
    determining whether the image contains a gesture motion image matching with the preset gesture motion;
    when the image contains the gesture motion image matching with the preset gesture motion, obtaining an operation instruction corresponding to the gesture motion image, and controlling a function of the current interface that has the highest priority of the different priorities according to the operation instruction; and
    executing the operation instruction in response to the matching of the gesture motion image wherein the operation instruction causes the terminal device to answer a phone call.

2. The method according to claim 1, wherein when the image contains the gesture motion image, the method further comprises:
    determining a motion recognition animation corresponding to one of the interface identifiers, or determining a motion recognition animation corresponding to the gesture motion image; and
    displaying the motion recognition animation on the current interface.

3. The method according to claim 1, wherein determining whether the image contains the gesture motion image matching with the preset gesture motion comprises:
    obtaining a continuous multi-frame image, and identifying a plurality of candidate gesture motion images in the continuous multi-frame image;
    determining a change rule of a plurality of image features corresponding to the plurality of candidate gesture motion images; and
    determining whether the change rule of the plurality of image features matches with the change rule of the image feature corresponding to the preset gesture motion.

4. The method according to claim 1, wherein determining whether the image contains the gesture motion image matching with the preset gesture motion comprises:
    determining a gesture motion image contained in the current image; and
    determining whether an image feature of the gesture motion image matches with an image feature of the preset gesture motion.

5. The method according to claim 1, wherein after turning on the camera and displaying the image taken by the camera in the preset display area of the current interface, the method further comprises:
    receiving a zoom instruction of the preset display area; and
    adjusting a size of the preset display area according to the zoom instruction of the preset display area.

6. The method according to claim 1, wherein when the gesture control function is activated on the current interface, the method further comprises:
    determining an idle position of the current interface; and
    displaying a motion control icon in the idle position.

7. An apparatus for controlling a terminal device, comprising:
    one or more processors;
    a memory storing instructions executable by the one or more processors;
    wherein the one or more processors are configured to:
    when a gesture control function is activated on a current interface of the terminal device, obtain interface identifiers of different functions of the current interface and a preset gesture motion corresponding to interface identifiers of a function, wherein the preset gesture motion is a dynamic action composed of a series of actions and reflects a change rule of an image feature, the different functions having different priorities;
count a usage rate of each of the different functions;
assign the preset gesture motion to a particular function of the different functions based on the usage rate of the particular function being greater than a preset value;
turn on a camera and displaying an image taken by the camera in a preset display area of the current interface;
determine whether the image contains a gesture motion image matching with a preset gesture motion;
when the image contains the gesture motion image matching with the preset gesture motion, obtain an operation instruction corresponding to the gesture motion image, and control a function of the current interface that has the highest priority of the different priorities according to the operation instruction; and
execute the operation instruction in response to the matching of the gesture motion image wherein the operation instruction causes the terminal device to answer a phone call.

8. The apparatus according to claim 7, wherein the one or more processors are configured to:
obtain a continuous multi-frame image, and identify a plurality of candidate gesture motion images in the continuous multi-frame image;
determine a change rule of a plurality of image features corresponding to the plurality of candidate gesture motion images; and
determine whether the change rule of the plurality of image features matches with the change rule of the image feature corresponding to the preset gesture motion.

9. The apparatus according to claim 7, wherein the one or more processors are configured to:
determine a gesture motion image contained in the current image; and
determine whether an image feature of the gesture motion image matches with an image feature of the preset gesture motion.

10. The apparatus according to claim 7, wherein the one or more processors are configured to:
receive a zoom instruction of the preset display area; and
adjust a size of the preset display area according to the zoom instruction of the preset display area.

11. A non-transitory computer-readable storage medium storing computer instructions, wherein when the computer instructions are executed, a computer is caused to implement a method for controlling a terminal device, and the method comprises:
when a gesture control function is activated on a current interface of the terminal device, obtaining interface identifiers of different functions of the current interface and a preset gesture motion corresponding to interface identifiers of a function, wherein the preset gesture motion is a dynamic action composed of a series of actions and reflects a change rule of an image feature, the different functions having different priorities;
counting a usage rate of each of the different functions;
assigning the preset gesture motion to a particular function of the different functions based on the usage rate of the particular function being greater than a preset value;
turning on a camera and displaying an image taken by the camera in a preset display area of the current interface;
determining whether the image contains a gesture motion image matching with the preset gesture motion;
when the image contains the gesture motion image matching with the preset gesture motion, obtaining an operation instruction corresponding to the gesture motion image, and controlling a function of the current interface that has the highest priority of the different priorities according to the operation instruction; and
executing the operation instruction in response to the matching of the gesture motion image wherein the operation instruction causes the terminal device to answer a phone call.

* * * * *